(12) United States Patent
Morris

(10) Patent No.: US 7,337,748 B1
(45) Date of Patent: Mar. 4, 2008

(54) STACKABLE PLAY HOUSE FOR FELINE ANIMALS

(76) Inventor: Rosie L. Morris, 5505 Evelyn St., Texas City, TX (US) 77591

( * ) Notice: Subject to any disclaimer, the term of this patent is extended or adjusted under 35 U.S.C. 154(b) by 239 days.

(21) Appl. No.: 11/094,599

(22) Filed: Mar. 31, 2005

(51) Int. Cl.
*A01K 1/03* (2006.01)
(52) U.S. Cl. ........................... 119/482; 119/485
(58) Field of Classification Search ............... 119/482, 119/485, 452, 455, 456, 480; D30/108
See application file for complete search history.

(56) References Cited

U.S. PATENT DOCUMENTS

| | | | |
|---|---|---|---|
| 3,020,601 A * | 2/1962 | Stambaugh et al. .......... 52/262 |
| 4,497,279 A | 2/1985 | Bell | |
| 4,803,952 A | 2/1989 | Houser | |
| 5,099,794 A | 3/1992 | Pearce, Jr. | |
| 5,121,710 A * | 6/1992 | Gonzalez ................... 119/498 |
| D364,489 S | 11/1995 | Cook | |
| 5,551,371 A * | 9/1996 | Markey et al. ............. 119/499 |
| 5,678,509 A | 10/1997 | Dillon | |
| 5,964,189 A * | 10/1999 | Northrop et al. ........... 119/482 |
| 6,606,965 B2 * | 8/2003 | Saxe et al. ................. 119/482 |
| 7,051,679 B2 * | 5/2006 | Bello ......................... 119/482 |

* cited by examiner

*Primary Examiner*—T. Nguyen

(57) ABSTRACT

A play house includes first and second support members having substantially planar top and bottom surfaces respectively. A first plurality of support walls confront the first and second support members. A plurality of elbow shaped brackets having first and seconds portions are securely conjoined to the bottoms surfaces of the first and second support members. A staircase having opposed end portions is attached to the first and second support members. A pitched roof is removably connected to upper ones of the support walls and is formed from water-impermeable material. The first and second support members further have axially opposed end portions laterally offset in such a manner that one of the end portions of the first and second members protrudes outwardly away from selected ones of the support walls for defining a plurality of porches onto which animals may jump when entering the play house.

17 Claims, 7 Drawing Sheets

STACKABLE PLAY HOUSE FOR FELINE ANIMALS

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to pet houses and, more particularly, to a stackable play house for cats.

2. Prior Art

The housecat (Felis domesticus) is often chosen as a pet because of its intelligence and personality. The cat's intelligence allows training and the ability to adapt to the human household. The adaptation of the cat requires the presence of humans who form the cat's family group, much the same as the family group of animals found in the natural state. The physical household and the yard areas form the cat's territory and are shared with the human family group. The responsibility attached to cat ownership includes the provision of proper nutrition, clean and detached litter areas, and comfortable sleeping, resting, or watching accommodations.

The provision of a resting and eating facility in a room of the host house establishes the area limit to the cat as far as these particular activities are concerned. If within the same area a "cat box" is often included, the entire area is considered to be feline territory and may be a source of objectionable odors as well as food and water spillage. The most objectionable problem is the psychological torment of the owners and the behavioral non-compliance of the cat when efforts are made to change or eliminate the undesirable features. Odor control is an especially vexing problem for which a variety of solutions have heretofore been proposed such as litter boxes, specially treated sand or pellets for use within the litter box, extremely pungent and heavily scented air fresheners and the like.

Various structures which house pets such as dogs and cats have been disclosed in the art. Such structures typically include an enclosed rest area which satisfies the animal's desire to "nest". Other, more elaborate, structures also include play areas. As they have the ability to satisfy an animal's need to rest, play, climb and watch, these elaborate structures, often referred to as "playhouses", are particularly well suited for cats.

While complex playhouse structures seek to combine aesthetics with a layout appealing to pets, such structures are often difficult to move and/or store, particularly if the structure includes multiple levels and/or a roof shaped to resemble the angled roof of a house or barn. Furthermore, as the transport and storage of such structures is often difficult, there has been little motivation to provide the aforementioned additional features which are often those most appealing to a cat.

Accordingly, a need remains for a play house that overcomes the above noted shortcomings. The present invention satisfies such a need by providing an amusing and entertaining sleeping and playing area that entertains a pet, such as a cat. Such a play house is a practical, inexpensive accessory for all owners of such pets, keeping them occupied while the owner is away. Such a play house is preferably stackable and could be used indoors or outdoors while providing a pet with plenty of exercise and playful enjoyment.

BRIEF SUMMARY OF THE INVENTION

In view of the foregoing background, it is therefore an object of the present invention to provide a stackable play house for entertaining small animals. These and other objects, features, and advantages of the invention are provided by a play house including first and second support members oriented along a horizontal plane and having substantially planar top and bottom surfaces respectively. The first and second support members further have centrally registered longitudinal axes traversing a centrally disposed vertical axis passing through the play house. One of the first and second support members has an opening formed therein for defining a continuous travel path between the first and second floors of the play house and another of the support members includes a top layer formed from carpet material that provides a soft surface onto which the animals may scratch their paws.

The play house further includes a first plurality of vertically oriented support walls confronting the first and second support members and equidistantly spaced from the vertical axis. Selected ones of the support walls have openings sized and shaped in such a manner that ambient light can penetrate through selected ones of the openings while other ones of the openings allow the animals to ingress and egress in the play house. A plurality of window frames are positioned about selected ones of the openings respectively.

A plurality of elbow shaped brackets having first and second portions are securely conjoined to the bottom surfaces of the first and second support members and extend perpendicular thereto respectively. A staircase having opposed end portions is attached to the first and second support members and is nested therebetween for allowing the animals to travel upwardly and downwardly between the first and second support members while positioned within the play house.

A pitched roof is preferably removably connected to upper ones of the support walls and may be formed from water-impermeable material for preventing undesirable foreign debris from entering the play house. The first and second support members further have axially opposed end portions laterally offset from the axis in such a manner that one of the end portions of the first and second members protrudes outwardly away from selected ones of the support walls for defining a plurality of porches onto which animals may jump when entering the play house. The porches are preferably situated on opposed sides of the play house and the brackets are securely connected to the porches respectively.

The play house further includes a plurality of rectilinear leg members having opposed end portions connected to the first support member and positional on a ground surface. The rectilinear leg members are preferably registered parallel to the longitudinal axis. A plurality of support braces having opposed end portions may be connected to the rectilinear leg members and the first support member respectively. One of the elbow shaped brackets is secured to one of the rectilinear leg members and another of the elbow shaped brackets is secured to one of the support walls respectively.

The play house further includes a second plurality of support walls stacked above the second support member and securely connected thereto via a plurality of fasteners and third and fourth support members coextensively shaped and positioned with the first and second support members. The fourth support member has an opening formed therein for allowing the animals to readily travel between the third and fourth floors respectively.

The play house further includes a third plurality of support walls stacked onto the fourth support member and securely connected thereto via a plurality of fasteners and fifth and sixth support members coextensively shaped with the third and fourth support members. The sixth support member has an opening formed therein for allowing the animals to readily travel between the fifth and sixth floors respectively.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
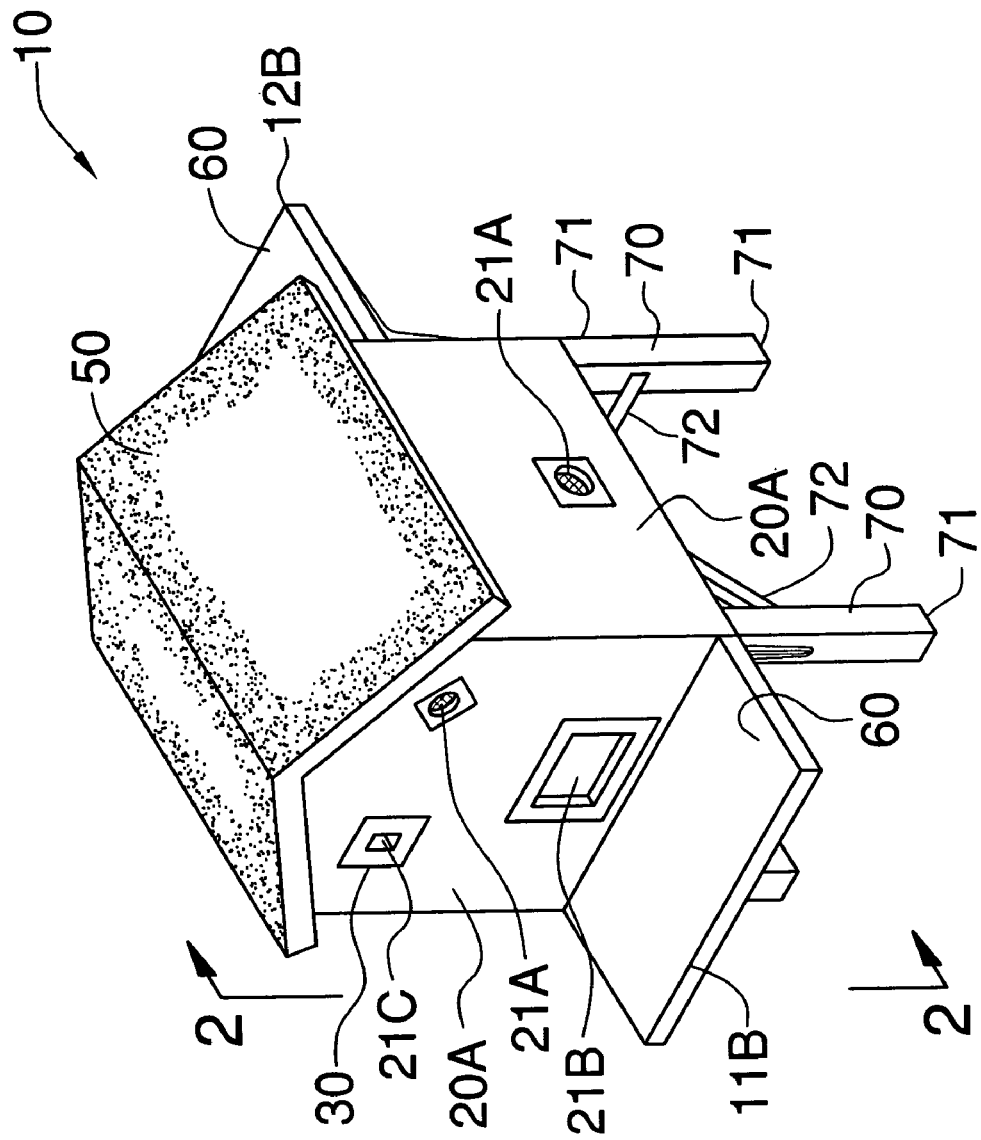
FIG. 1 is a perspective view showing a stackable play house for feline animals, in accordance with the present invention.
Figure 2:
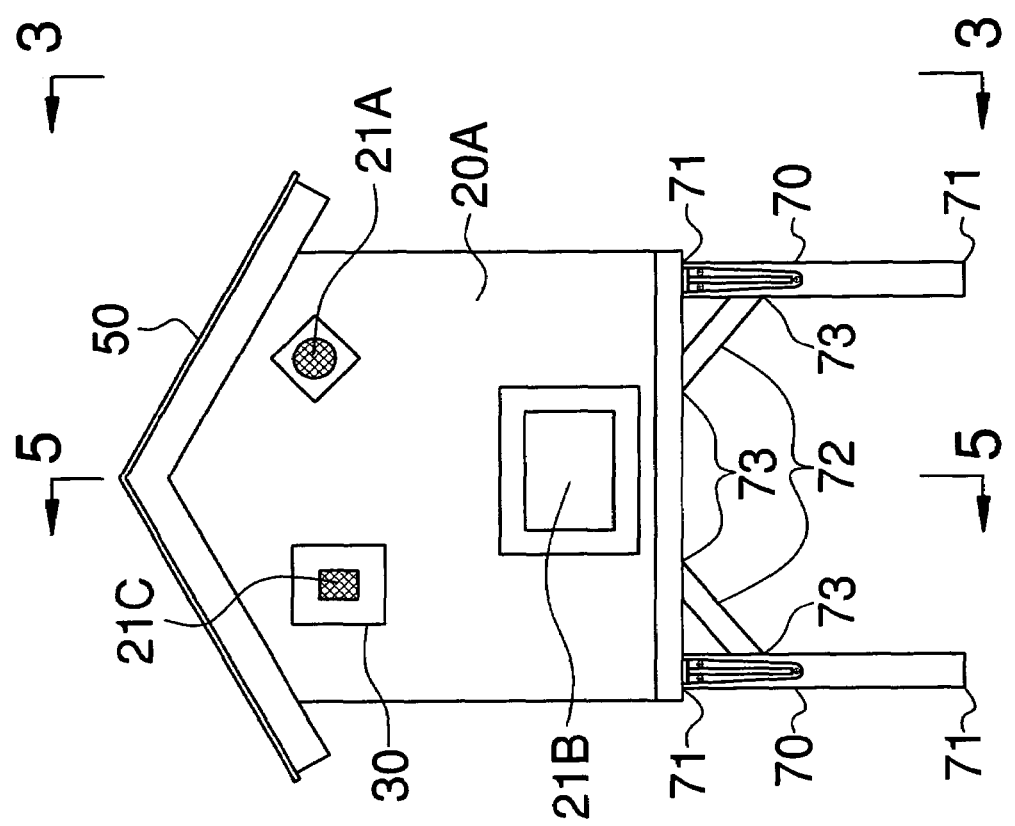
FIG. 2 is a cross-sectional view of the play house shown in FIG. 1, taken along 2-2.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The apparatus of this invention is referred to generally in FIGS. 1-7 by the reference numeral 10 and is intended to provide a stackable play house for entertaining small animals. It should be understood that the apparatus 10 may be used to entertain many different types of animals and should not be limited in use to only cats.

Figure 5:
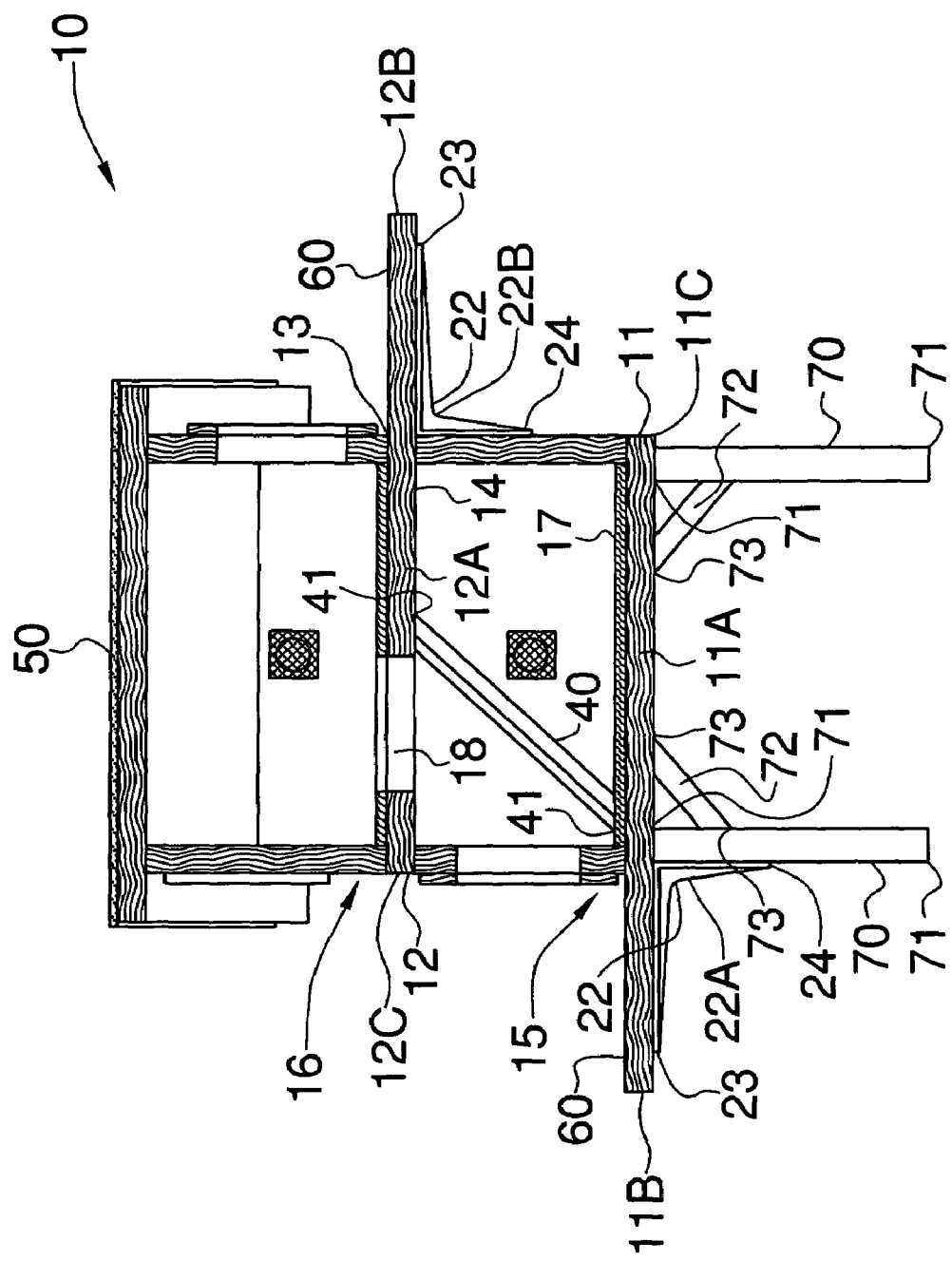
FIG. 5 is a cross-sectional view of the play house shown in FIG. 2, taken along line 5-5.
Figure 6:
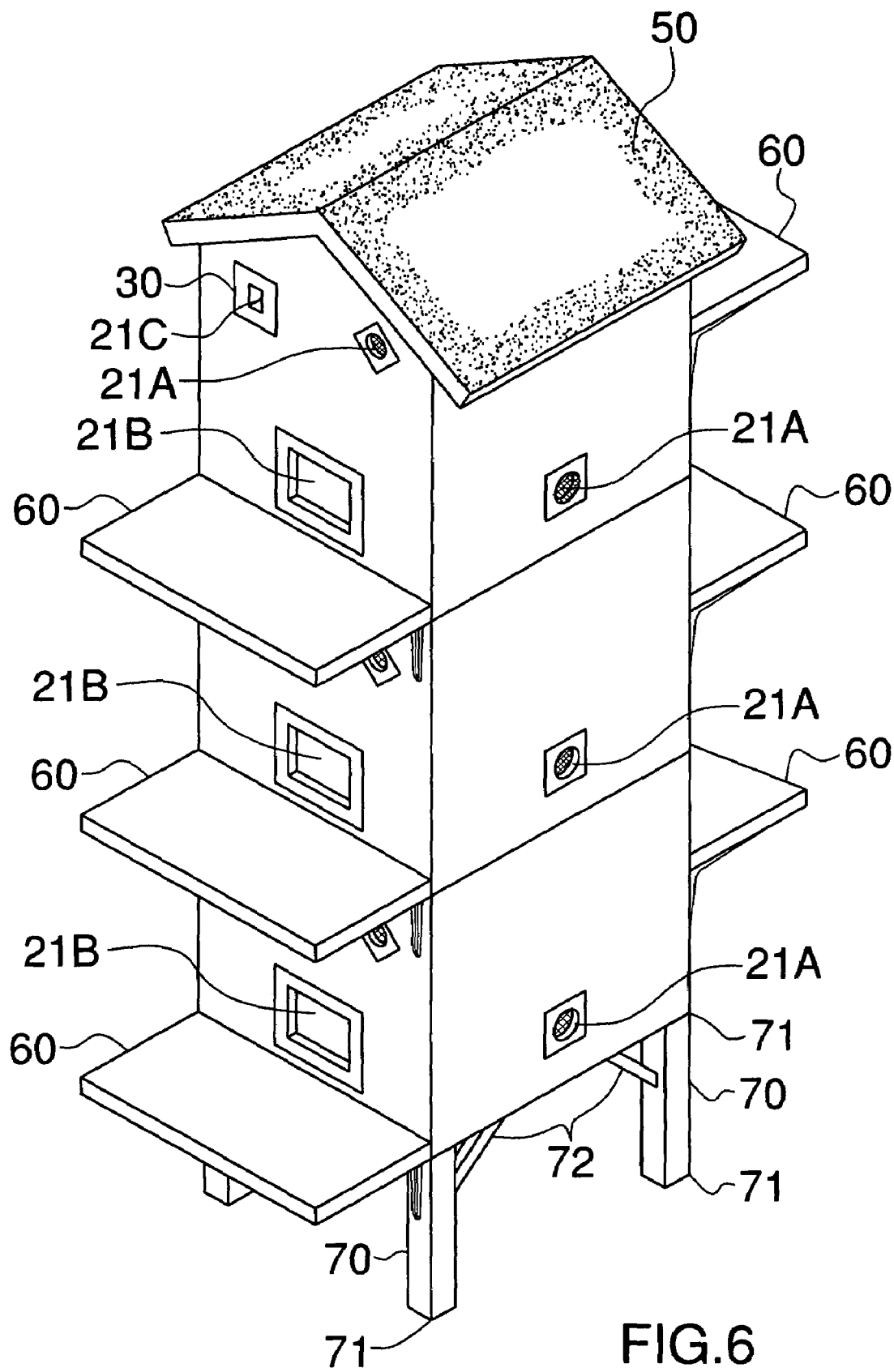
FIG. 6 is a perspective view of a plurality of stackable play houses vertically nested.
Figure 7:
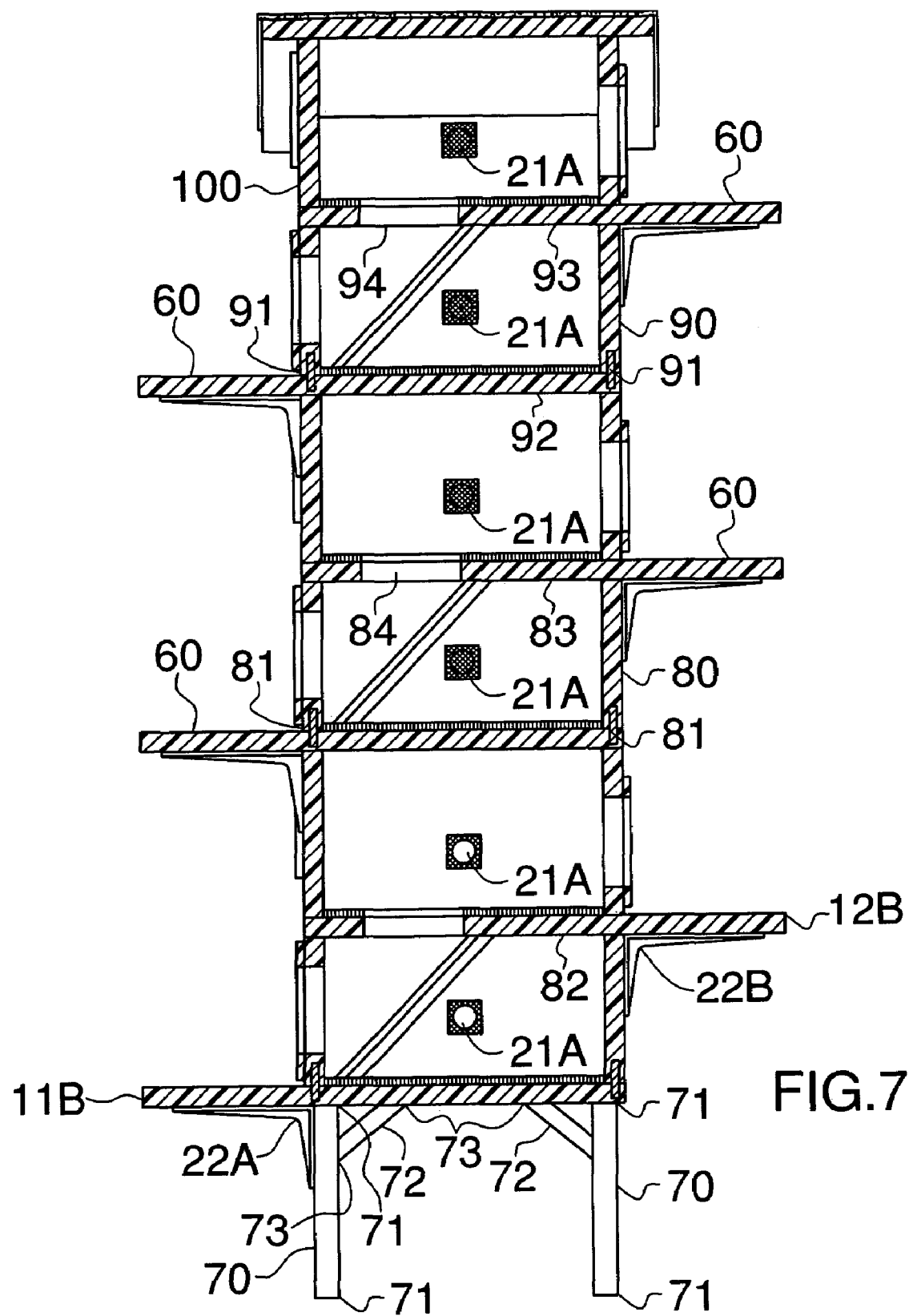
FIG. 7 is a cross-sectional view of the nested play houses shown in FIG. 6.

Referring initially to FIGS. 1, 5, and 7, the play house 10 includes first 11 and second 12 support members oriented along a horizontal plane and having substantially planar top 13 and bottom surfaces 14 respectively. The first 11 and second 12 support members further have centrally registered longitudinal axes (not shown) traversing a centrally disposed vertical axis passing through the play house 10. One 12A of the first 11 and second 12 support members has an opening 18 formed therein for defining a continuous travel path between the first 15 and second 16 floors of the play house 10 and another 11A of the support members includes a top layer 17 formed from carpet material that provides a soft surface onto which the animals may scratch their paws. Cats have a natural tendency to claw at objects and the top layer 17 provides them with a convenient surface at which to claw.

Referring to FIGS. 1 through 4, and 6, the play house 10 further includes a first 20 plurality of vertically oriented support walls confronting the first 11 and second 12 support members and equidistantly spaced from the vertical axis. Selected ones 20A of the support walls 20 preferably have openings 21 sized and shaped in such a manner that ambient light can penetrate through selected ones 21A of the openings 21 while other ones 21B of the openings 21 allow the animals to ingress and egress in the play house. Such openings 21A are critical to the use of the play house 10 for without them, the interior would be dark and cats would be reluctant to remain inside for any meaningful length of time. A plurality of window frames 30 are positioned about selected ones 21C of the openings 21 respectively. Such openings 21 enable a cat to see and reach out to its owner or other cats and provide a sense of security so the cat does not become scared and panicked inside the play house.

Referring to FIGS. 5 and 7, a plurality of elbow shaped brackets 22 having first 23 and second 24 portions are securely conjoined to the bottom surfaces 14 of the first 11 and second 12 support members and extend perpendicular thereto respectively. A staircase 40 having opposed end portions 41 is attached to the first 11 and second 12 support members and is nested therebetween for allowing the animals to travel upwardly and downwardly between the first 11 and second 12 support members while positioned within the play house 10. Such a staircase 40 is essential to the operation of the play house 10 for without it, cats would be confined to one area, and unable to freely roam the entire interior.

Referring to FIGS. 1 through 4, a pitched roof 50 is removably connected to upper ones of the support walls 20 and is formed from water-impermeable material for preventing undesirable foreign debris from entering the play house 10. The first 11 and second 12 support members further have axially opposed end portions 11B, 11C, 12B, 12C, laterally offset from the axis in such a manner that one 11B, 12B of the end portions of the first 11 and second 12 support members protrudes outwardly away from selected ones of the support walls 20 for defining a plurality of porches 60 onto which animals may jump when entering the play house 10.

The porches 60 are preferably situated on opposed sides of the play house 10 and the brackets 22 are securely connected to the porches 60 respectively. Such brackets 22 provide support for the porches 60, enabling cats to remain positioned thereon for extended periods of time should they so desire. Cats may also desire to jump off of the porches 60 during play for their enjoyment, as is obvious to one having ordinary skill in the art. Such a play house 10 is preferably formed from durable plastic or wood, but may be formed of metal such as aluminum, or heavy duty cardboard, as well known in the industry.

Figure 3:
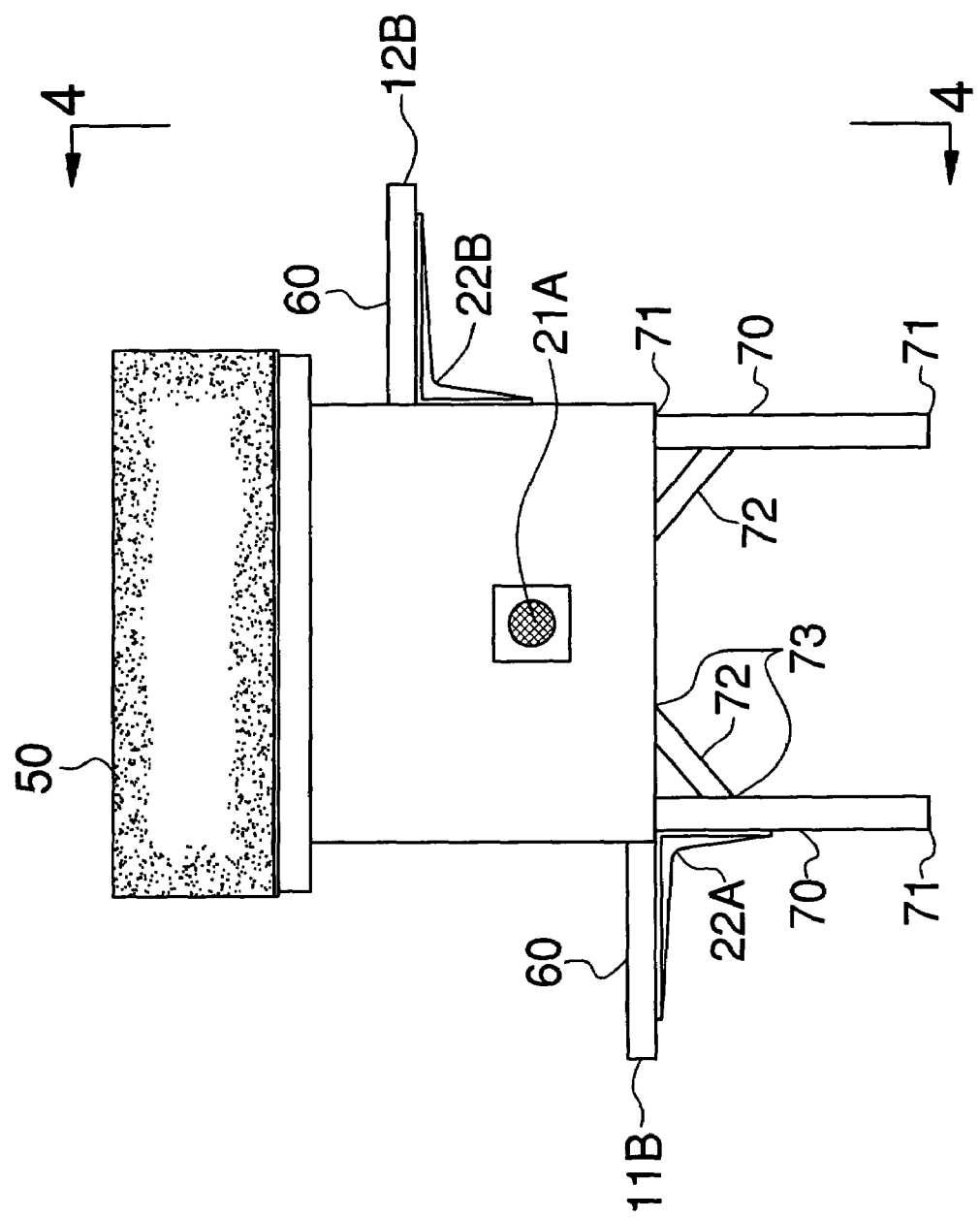
FIG. 3 is a cross-sectional view of the play house shown in FIG. 2, taken along line 3-3.
Figure 4:
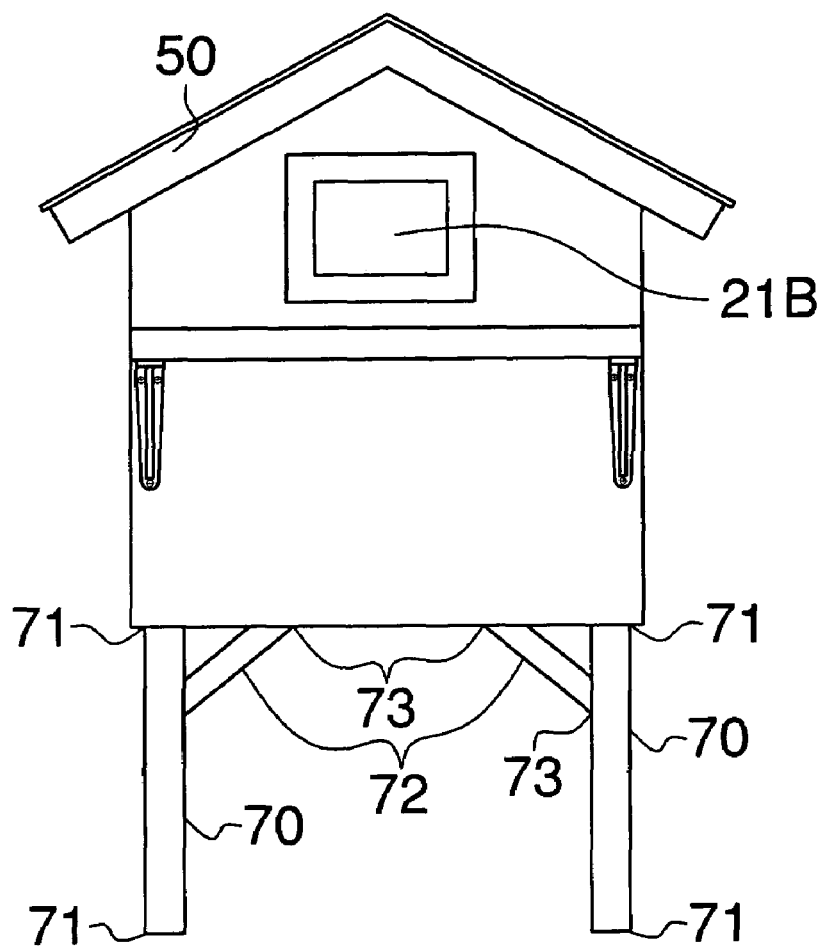
FIG. 4 is a cross-sectional view of the play house shown in FIG. 3, taken along line 4-4.

Referring to FIGS. 3, 5, and 7, the play house 10 further includes a plurality of rectilinear leg members 70 having opposed end portions 71 connected to the first support member 11 and positional on a ground surface. The rectilinear leg members 70 are preferably registered parallel to the longitudinal axis. A plurality of support braces 72 having opposed end portions 73 are preferably connected to the rectilinear leg members 70 and the first support member 11 respectively. Such support braces 72 add strength to the play house 10, enabling it to safely hold one or more cats of varying weight. One 22A of the elbow shaped brackets 22 is secured to one of the rectilinear leg members 70 and another 22B of the elbow shaped brackets 22 is secured to one of the support walls 20 respectively.

Referring to FIG. 7, the play house 10 further includes a second plurality of support walls 80 stacked above the second support member 12 and securely connected thereto via a plurality of fasteners 81 and third 82 and fourth 83 support members coextensively shaped and positioned with the first 11 and second 12 support members. The fourth support member 83 has an opening 84 formed therein for allowing the animals to readily travel between third and fourth floors respectively.

Referring again to FIG. 7, the play house 10 further includes a third plurality of support walls 90 stacked onto the fourth support member 83 and securely connected thereto via a plurality of fasteners 91 and fifth 92 and sixth 93 support members coextensively shaped with the third 82 and fourth 83 support members. The sixth support member 93 has an opening 94 formed therein for allowing the animals to readily travel between fifth and sixth floors respectively.

The play house 10 is practical, convenient, versatile and easy to use. Such a play house may be produced in a variety of colors and decorative designs and serves to occupy a pet for hours at a time while providing needed exercise.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

The invention claimed is:

1. A stackable play house for entertaining small animals, said play house comprising:

first and second support members oriented along a horizontal plane and having substantially planar top and bottom surfaces respectively, said first and second support members further having centrally registered longitudinal axes traversing a centrally disposed vertical axis passing through said play house, one said first and second support members having an opening formed therein for defining a continuous travel path between first and second floors of said play house, another said support members including a top layer formed from carpet material that provides a soft surface onto which the animals may scratch their paws;

a first plurality of vertically oriented support walls confronting said first and second support members and being equidistantly spaced from the vertical axis, selected ones of said support walls having openings sized and shaped in such a manner that ambient light can penetrate through selected ones of the openings while other ones of the openings allow the animals to ingress and egress in said play house;

a plurality of elbow shaped brackets having first and second portions securely conjoined to said bottom surfaces of said first and second support members and extending perpendicular thereto respectively;

a staircase having opposed end portions attached to said first and second support members and being nested therebetween for allowing the animals to travel upwardly and downwardly between said first and second support members while positioned within said play house; and a pitched roof removably connected to upper ones of said support walls, said pitched roof being formed from water-impermeable material for preventing undesirable foreign debris from entering said play house;

wherein said first and second support members further having axially opposed end portions laterally offset from the axis in such a manner that one said end portions of said first and second members protrude outwardly away from selected ones of said support walls for defining a plurality of porches onto which animals may jump when entering said play house.

2. The play house of claim 1, wherein said porches are situated on opposed sides of said play house.

3. The play house of claim 1, further comprising:

a plurality of rectilinear leg members having opposed end portions connected to said first support member and positional on a ground surface, said rectilinear leg members being registered parallel to the longitudinal axis; and a plurality of support braces having opposed end portions connected to said rectilinear leg members and said first support member respectively.

4. The play house of claim 3, wherein one said elbow shaped brackets is secured to one said rectilinear leg members and another said elbow shaped brackets is secured to one said support walls respectively.

5. The play house of claim 1, further comprising:

a second plurality of support walls stacked above said second support member and securely connected thereto via a plurality of fasteners; and third and fourth support members being coextensively shaped and positioned with said first and second support members, said fourth support member having an opening formed therein for allowing the animals to readily travel between third and fourth floors respectively.

6. The play house of claim 5, further comprising:

a third plurality of support walls stacked onto said fourth support member and securely connected thereto via a plurality of fasteners; and fifth and sixth support members being coextensively shaped with said third and fourth support members, said sixth support member having an opening formed therein for allowing the animals to readily travel between fifth and sixth floors respectively.

7. A stackable play house for entertaining small animals, said play house comprising:

first and second support members oriented along a horizontal plane and having substantially planar top and bottom surfaces respectively, said first and second support members further having centrally registered longitudinal axes traversing a centrally disposed vertical axis passing through said play house, one said first and second support members having an opening formed therein for defining a continuous travel path between first and second floors of said play house, another said support members including a top layer formed from carpet material that provides a soft surface onto which the animals may scratch their paws;

a first plurality of vertically oriented support walls confronting said first and second support members and being equidistantly spaced from the vertical axis, selected ones of said support walls having openings sized and shaped in such a manner that ambient light can penetrate through selected ones of the openings while other ones of the openings allow the animals to ingress and egress in said play house;

a plurality of window frames positioned about selected ones of said openings respectively;

a plurality of elbow shaped brackets having first and second portions securely conjoined to said bottom surfaces of said first and second support members and extending perpendicular thereto respectively;

a staircase having opposed end portions attached to said first and second support members and being nested therebetween for allowing the animals to travel upwardly and downwardly between said first and second support members while positioned within said play house; and a pitched roof removably connected to upper ones of said support walls, said pitched roof being formed from water-impermeable material for preventing undesirable foreign debris from entering said play house;

wherein said first and second support members further having axially opposed end portions laterally offset from the axis in such a manner that one said end portions of said first and second members protrude outwardly away from selected ones of said support walls for defining a plurality of porches onto which animals may jump when entering said play house.

8. The play house of claim 7, wherein said porches are situated on opposed sides of said play house.

9. The play house of claim 7, further comprising:

a plurality of rectilinear leg members having opposed end portions connected to said first support member and positional on a ground surface, said rectilinear leg members being registered parallel to the longitudinal axis; and a plurality of support braces having opposed end portions connected to said rectilinear leg members and said first support member respectively.

10. The play house of claim 9, wherein one said elbow shaped brackets is secured to one said rectilinear leg members and another said elbow shaped brackets is secured to one said support walls respectively.

11. The play house of claim 7, further comprising:

a second plurality of support walls stacked above said second support member and securely connected thereto via a plurality of fasteners; and third and fourth support members being coextensively shaped and positioned with said first and second support members, said fourth support member having an opening formed therein for allowing the animals to readily travel between third and fourth floors respectively.

12. The play house of claim 11, further comprising:

a third plurality of support walls stacked onto said fourth support member and securely connected thereto via a plurality of fasteners; and fifth and sixth support members being coextensively shaped with said third and fourth support members, said sixth support member having an opening formed therein for allowing the animals to readily travel between fifth and sixth floors respectively.

13. A stackable play house for entertaining small animals, said play house comprising:

first and second support members oriented along a horizontal plane and having substantially planar top and bottom surfaces respectively, said first and second support members further having centrally registered longitudinal axes traversing a centrally disposed vertical axis passing through said play house, one said first and second support members having an opening formed therein for defining a continuous travel path between first and second floors of said play house, another said support members including a top layer formed from carpet material that provides a soft surface onto which the animals may scratch their paws;

a first plurality of vertically oriented support walls confronting said first and second support members and being equidistantly spaced from the vertical axis, selected ones of said support walls having openings sized and shaped in such a manner that ambient light can penetrate through selected ones of the openings while other ones of the openings allow the animals to ingress and egress in said play house;

a plurality of window frames positioned about selected ones of said openings respectively;

a plurality of elbow shaped brackets having first and second portions securely conjoined to said bottom surfaces of said first and second support members and extending perpendicular thereto respectively;

a staircase having opposed end portions attached to said first and second support members and being nested therebetween for allowing the animals to travel upwardly and downwardly between said first and second support members while positioned within said play house; and a pitched roof removably connected to upper ones of said support walls, said pitched roof being formed from water-impermeable material for preventing undesirable foreign debris from entering said play house;

wherein said first and second support members further having axially opposed end portions laterally offset from the axis in such a manner that one said end portions of said first and second members protrude outwardly away from selected ones of said support walls for defining a plurality of porches onto which animals may jump when entering said play house, said porches being situated on opposed sides of said play house, said brackets being securely connected to said porches respectively.

14. The play house of claim 13, further comprising:
a plurality of rectilinear leg members having opposed end portions connected to said first support member and positional on a ground surface, said rectilinear leg members being registered parallel to the longitudinal axis; and
a plurality of support braces having opposed end portions connected to said rectilinear leg members and said first support member respectively.

15. The play house of claim 14, wherein one said elbow shaped brackets is secured to one said rectilinear leg members and another said elbow shaped brackets is secured to one said support walls respectively.

16. The play house of claim 13, further comprising:
a second plurality of support walls stacked above said second support member and securely connected thereto via a plurality of fasteners; and
third and fourth support members being coextensively shaped and positioned with said first and second support members, said fourth support member having an opening formed therein for allowing the animals to readily travel between third and fourth floors respectively.

17. The play house of claim 16, further comprising:
a third plurality of support walls stacked onto said fourth support member and securely connected thereto via a plurality of fasteners; and
fifth and sixth support members being coextensively shaped with said third and fourth support members, said sixth support member having an opening formed therein for allowing the animals to readily travel between fifth and sixth floors respectively.

* * * * *